May 24, 1932.     F. R. GOOD     1,860,025
PISTON RING
Filed June 4, 1931
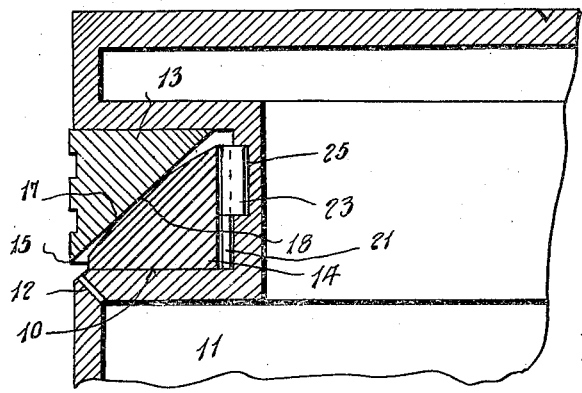
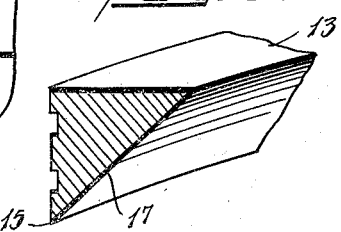
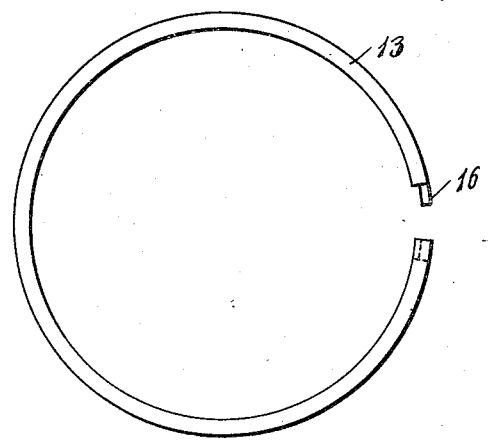
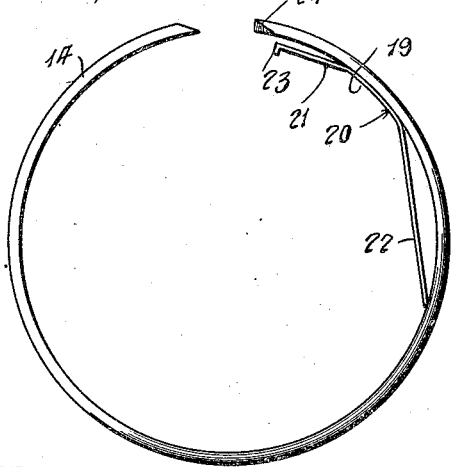
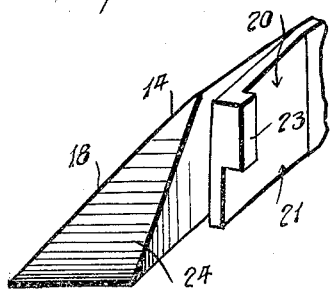
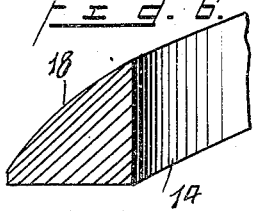
Inventor
F. R. Good.

Patented May 24, 1932

1,860,025

UNITED STATES PATENT OFFICE

FRANCIS R. GOOD, OF THE UNITED STATES NAVY

PISTON RING

Application filed June 4, 1931. Serial No. 542,163.

This invention relates to a piston ring having a self-adjusting construction, which ring and construction are applicable and may be used on pistons of all types of internal combustion engines, steam engines, all types of compressors and pumps.

My invention aims to provide a novel piston ring of a two part construction which has the following more specific objects and advantages:

1. Prevention of piston slapping.
2. Prevention of oil pumping.
3. Providing for adequate lubrication of the cylinder.
4. Removal of excess oil from cylinder wall.
5. Self-adjusting construction which compensates for wear so that the ring is maintained tight in the piston ring groove, taking up all lateral wear of ring in this groove.
6. Self-adjusting construction which compensates for wear between the outer surface of the ring bearing against the cylinder wall, so as to maintain an even tension tight piston ring against cylinder wall.

These specific objects and advantages will become apparent from a consideration of the following description taken in connection with the accompanying drawings illustrative of the construction and features of installation of my invention.

In said drawings:—

Figure 1 is a central vertical sectional view fragmentarily showing the invention applied to a piston of an internal combustion engine, Figure 2 is a side elevation of the complete ring, Figure 3 is a plan view of the outer section of the ring, Figure 4 is a plan view of the inner section of the ring, Figure 5 is a detail perspective view of the anchoring end of the inner ring, Figure 6 is a fragmentary perspective view illustrating an intermediate portion of the inner ring, Figure 7 is a fragmentary front elevation showing the joint of the inner ring, and Figure 8 is a fragmentary perspective view of the outer ring.

Referring specifically to the drawings, the invention is shown as applied in a groove 10 of a piston 11 of the type used in an internal combustion engine although of course the invention is capable of broad use wherever a piston ring or its equivalent is capable of use. Leading diagonally inward from the base of the groove 10, is an oil drain passageway 12.

The piston ring is composite since it embodies an outer ring section 13 and an inner ring section 14, the latter being slightly oversize with respect to the former so that the proper expansion will ensue to cause the outer ring to maintain intimate contact with the wall of the cylinder and at its lower edge 15, scrape such wall of surplus oil so that it will drain back through the passageway 12. Section 13 may have a lap joint or any other preferred joint at 16. The diagonal surface of section 13 as at 17, is preferably machined at approximately 42° and the cross section of the outer ring shows a right angle triangle having angles of 90° and approximately 42° and 48°.

The inner section is substantially triangular in cross section and machined using the same angles 48°–42°–90° but so located that when the two diagonal surfaces of the ring bear against each other, the 42° angle of the outer ring is imposed on the 48° angle of the inner ring. The diagonal surface of the inner ring is ground to present a convex surface 18 the radius of which varies in accordance with the width of the ring.

Welded or brazed to the inner surface of the section 14 and intermediate of the ends thereof at 19 is an expander spring 20 with its ends 21 and 22 normally sprung inwardly, as shown in Figure 4. The portion 21 has an inwardly extending lug at 23, and the section 14 may have its joint along diagonal lines as at 24, although an equivalent joint may be substituted.

In the use of the device, the lug 23 is disposed in a recess 25 located in a wall adjacent the groove 10 as a result of which, the section 14 is anchored and the spring portion 22 causes the exertion of proper pressure to maintain the ring in intimate engagement with the cylinder wall. The ring section 14, being anchored, cannot turn, and hence it prevents turning of the section 13 and causes both ring sections to always move in the same line, more accurately adapting and seating itself against the cylinder wall. The lug 23 is so located in the piston ring groove that the spring 20 exerts pressure on the piston, and holding the ring against the wall of the cylinder, thus preventing piston slapping.

Because of the space provided between the inner section 14 and the outer section 13, in the rear of edge 15, I find in operation, that a vacuum is created which holds and moves a ring of lubricant up and down on the cylinder wall, and that excess oil will be drained through openings 12 to the inside of the piston and from thence returned to the crank case.

The parts constituting the ring may be made of any suitable materials, that at 13 preferably being of cast iron. The section 14 may also be of cast iron or if desired of mild steel heat treated. The spring 20 is preferably made of spring steel.

When in position, as shown in Figure 1, it will be apparent that the diagonally disposed surfaces 17 and 18 provides for movement of the outer ring 13 radially of the piston into intimate engagement with the walls of the engine cylinder, and simultaneously the two rings, 13 and 14, are moved upwardly and downwardly, respectively, or laterally of the rings into intimate engagement with the respective walls of the groove 10. This movement of the rings will be caused by the expansion of the rings that are formed normally spread at their ends, as shown in Figures 3 and 4, and by the action of the free ends 21 and 22 of spring 20. Furthermore, the free end 21 insures that the lug 23 will remain in engagement in recess 25.

Various changes may be resorted to provided they fall within the spirit and scope of the invention.

I claim as my invention:—

1. A piston ring structure comprising an outer section and an inner section, said sections being substantially triangular and engaging at their diagonal surfaces, the engaging portion of the inner section being convex providing means whereby said sections at the outer lower corner of the ring are spaced apart so that in operation a scraping edge is provided for engagement with the cylinder wall and such space will create a vacuum to retain and move a body of lubricant, a spring secured intermediate of its ends to the inner side of the inner section, a lug on one end of said spring, and a piston provided with a recess to receive said lug to prevent circumferential movement of the ring section on the piston.

2. A piston ring structure comprising an outer section and an inner section, said sections being substantially triangular and engaging at their diagonal surfaces, said sections at the outer lower corner of the ring being spaced apart so that in operation a scraping edge is provided for engagement with the cylinder wall and such space will create a vacuum to retain and move a body of lubricant, a spring member carried by the inner ring, said member at one end having a lug engageable with a piston to prevent turning of the section relatively to the piston, one end of said spring member being free and angularly disposed to serve as an expander.

In testimony whereof I affix my signature.

FRANCIS R. GOOD.